United States Patent [19]

Sugino et al.

[11] Patent Number: 4,747,603
[45] Date of Patent: May 31, 1988

[54] OIL SEAL COMPRISING LIP SEAL WITH THERMAL EXPANSION CONTROLLED REINFORCING RING

[75] Inventors: Eiichi Sugino; Eigoro Tsukagoshi; Yoshio Arai, all of Tokyo, Japan

[73] Assignee: Arai Seisakusho Co., Ltd., Tokyo, Japan

[21] Appl. No.: 932,441

[22] Filed: Nov. 18, 1986

[30] Foreign Application Priority Data

Dec. 26, 1985 [JP] Japan ................... 60-297176

[51] Int. Cl.⁴ .............................. F16J 15/32
[52] U.S. Cl. ........................ 277/26; 277/50; 277/153; 277/166; 277/235 A
[58] Field of Search ............ 277/22, 26, 50, 152, 277/153, 166, 235 R, 235 A, 236, DIG. 6

[56] References Cited

U.S. PATENT DOCUMENTS

| | | | |
|---|---|---|---|
| 3,084,944 | 4/1963 | Stucke | 277/26 |
| 3,440,122 | 4/1969 | McCormick | 277/153 X |
| 4,426,094 | 1/1984 | Antonini | 277/50 X |

FOREIGN PATENT DOCUMENTS

| | | | |
|---|---|---|---|
| 662213 | 12/1951 | United Kingdom | 277/235 A |
| 765578 | 9/1980 | U.S.S.R. | 277/153 |

Primary Examiner—Robert S. Ward
Attorney, Agent, or Firm—Charles N. Quinn

[57] ABSTRACT

An oil seal of the type having a metallic reinforcement rig whose outer peripheral portion is oil-tightly fitted into a housing, characterized in that after the formation of fabrication of said metallic reinforcement ring, the latter is subjected to a nitriding hardening process so that its durability of a raw material of said metallic reinforcement ring; and a seal lip of formed over the inner peripheral edge portion of an annular flange portion of said metallic reinforcement ring.

3 Claims, 4 Drawing Sheets

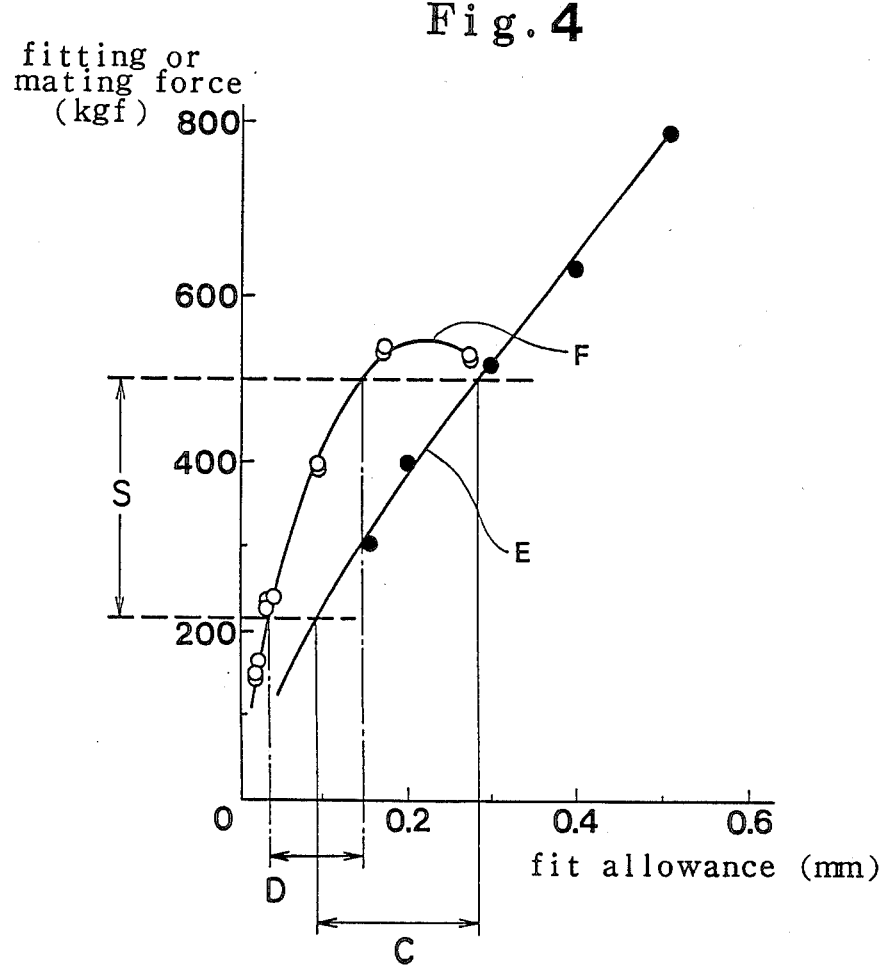

OIL SEAL COMPRISING LIP SEAL WITH THERMAL EXPANSION CONTROLLED REINFORCING RING

FIELD OF THE INVENTION

The present invention relates to an oil seal of a type called metal periphery type oil seal and more particularly an oil seal adapted to be fitted in a housing which is heated to high temperatures as in the case of sealing the crankshaft of an automotive engine.

BACKGROUND OF THE INVENTION

In general, this type of oil seal has at its outer peripheral portion a metallic reinforcement ring adapted to be fitted to a stationary part such as a housing and at its inner peripheral portion a rubber lip adapted to be made into sliding contact with a rotary shaft.

In the conventional oil seals of the type described, metallic reinforcement rings are made of cold rolled sheet steel and are designed and constructed so as to have a predetermined fitting allowance so that they are relatively easily fitted into the housings and are securely maintained in position by a fitting force (pulling load) which can sufficiently prevent the metallic reinforcement rings from easily being pulled out of the housings.

However, when an oil seal of the type described is fitted into a housing and is securely retained in position, even when the outer peripheral portion of a metallic reinforcement ring which is made of cold rolled sheet steel and is 0.5 mm in thickness and 100 mm in outer diameter has a maximum fit allowance (interference) of the order of 0.4 mm with which the metallic reinforcement ring can be fitted into the housing as indicated by the curve B in FIG. 2, there arises the problem, the residual fit allowance (that is, an allowance measured immediately after the metallic reinforcement ring is pulled out of the housing after it has been fitted therein) drops to about 0.08 mm due to the plastic deformations of the metallic reinforcement ring immediately resulting of the fitting of the metallic reinforcement ring into the housing.

When a housing is made of a material having a high coefficient of thermal expansion such as an aluminum alloy or a synthetic resin as compared with iron, the inner diameter of the housing is expanded greater than the outer diameter of the steel reinforcement ring as the temperature of the housing rises as indicated by the curve D in FIG. 3 so that the residual fit allowance is gradually decreased and becomes zero at about 105° C. and consequently the steel reinforcement ring becomes loose relative to the housing. As a result, there arise the problems that the oil leaks through the space or clearance between the housing and the steel reinforcement ring and that the steel reinforcement ring is forced to be pulled out of the housing.

Therefore, the conventional oil seals of the type in which the outer periphery of a metallic reinforcement ring is made into contact with the bore surface of a housing can be used only in conjunction with the housings made of a steel or the like having a coefficient of thermal expansion substantially same as a metallic reinforcement ring at a high temperature range. Furthermore, as described above, the residual fit allowance is significantly decreased immediately after the fitting of mating parts so that in order to maintain a suitable mating force immediately after the fitting of mating parts, thick cold rolled sheet steel must be used. In this case, a designed fit allowance must be maintained with a high degree of accuracy. More specifically, as indicated by the curve F in FIG. 4, the permissible tolerance range of a fit allowance relative to the permissible to tolerance range of a suitable fitting or mating force becomes narrow. As a result, in addition to the convetional press bending step, an additional step such as grinding step is needed in order to maintain a desired degree of accuracy, resulting in the increase in fabrication cost. At present, therefore, it is extremely difficult to maintain a desired degree of dimensional accuracies while avoiding the increase in fabrication cost.

Since it is extremely difficult to maintain a desired degree of dimensional accuracy of the metallic reinforcement rings as described above, there has been devised and demonstrated an oil seal with a rubber periphery in which a rubber layer is baked around the outer periphery of the metallic reinforcement ring so that the dimensional errors of the metallic reinforcement ring are compensated for by the elasticity of the rubber layer and consequently even when the dimensional accuracies of the metallic reinforcement ring are relaxed, a predetermined fit allowance can be maintained. However, a coefficient of thermal expansion of rubber is extremely higher than that of a metal and when the outer peripheral rubber layer of the metallic reinforcement ring is heated at high temperatures when the metallic reinforcement ring is fitted into the housing, the rubber layer is significantly compressed between the housing and the metallic reinforcement ring because there is no space available between them for permitting the expansion of the rubber layer. As a result, the elastic deformations of the rubber layer result so that when the rubber layer is cooled, the residual fit allowance is decreased, resulting in the oil leakage.

In addition, in case of the molding of the rubber layer around the outer periphery of the metallic reinforcement ring, rubber is made to flow not only into an inner peripheral seal lip portion but also the outer periphery from the bottom portion of the metallic reinforcement ring concurrently so that the quantity of rubber used is increased, resulting in the increase in both the fabrication cost and the weight of the oil seal. Furthermore, a high molding pressure is needed to form the rubber layer, the number of the rubber layers molded in the same die is less and moreover there is the problem that the percent of the defective fraction is high.

Recently the performance of the automotive engines is increasingly improved so that the oil seals having a high degree of resistance to heat capable of withstanding a temperature range from about 150° C. to 200° C. As a result, it becomes necessary to use high-quality and considerably expensive rubber such as fluoro rubber. Meanwhile the automotive engines are made of light metal alloys such as an aluminum alloy having a high coefficient of thermal expansion in order to make the engines light in weight. As a consequence, the oil seals must be made light in weight and must follow the thermal expansion of the engine. Although the requirements for oil seals become severe as described above, the costs of oils seals must be as low as possible.

BRIEF SUMMARY OF THE INVENTION

The present invention was made to overcome the above and other problems encountered in the conventional oil seals and has for its object to increase the strength and hardness of a metallic reinforcement ring so that the latter can have a high degree of durability or a high degree of elastic limit.

Another object of the present invention is to design and construct a metallic reinforcement ring with a high degree of durability so that when an oil seal is fitted into a housing, an initial fit allowance can be maintained and even when the housing having a high coefficient of thermal expansion is heated to high temperatures running from about 150° C. to 200° C., a sufficiently high degree of fitting or mating force can be maintained, thereby positively preventing the loosening of the metallic reinforcement ring relative to the housing, whereby the complete outer peripheral seal can be ensured all the time.

A further object of the present invention is to reduce the thickness of a metal reinforcing ring so that in case of forming, relatively large dimensional tolerances are allowed, the metallic reinforcement ring forming process is improved and the fabrication cost is reduced.

A still further object of the present invention is to provide an oil seal which is light in weight and inexpensive to manufacture because rubber is used only forming a seal lip portion, the formation of the seal lip portion is enhanced and the metal reinforcing ring is made thin in thickness so that the overall cost of the materials can be reduced.

To the above and other ends, according to the present invention, a metallic reinforcement ring is made of thin sheet steel and then is subjected to a hardening process such as a nitriding process or a cementation process so that the metallic reinforcement ring has a high degree of strength and a high degree of hardness and consequently has a high degree of durability or a high elastic limit.

According to the present invention, the metallic reinforcement ring is subjected to the hardening process as described above so that the outer periphery thereof has a high degree of durability. Therefore when an oil seal in accordance with the present invention is fitted into a housing having a high coefficient of thermal expansion and when the housing is heated at high temperatures, a predetermined fit allowance can be satisfactorily maintained so that the leakage of oil due to the loosening of the fitting or mating force and the coming off of the oil seal from the housing can be positively prevented.

The metallic reinforcement ring is subjected to the hardening process such as a nitriding process in order to enhance its durability so that the metallic reinforcement rings can be made of an extremely thin sheet steel and dimensional tolerances can be significantly relaxed so that the fabrication of metallic reinforcement rings can be considerably simplified and the fabrication cost can be remarkably reduced. In addition, rubber is used only to form a seal lip portion so that a low molding pressure may be used and a large number of seal lip portions may be formed by one step. Furthermore, the quantity of rubber used can be reduced so that the weight of rubber used can be decreased. As a consequence, the present invention can provide the oil seals which are light in weight and inexpensive to manufacture yet highly reliable and dependable in operation.

BRIEF DESCRIPTION OF THE DRAWINGS

FIG. 4 is a graph illustrating the relationships between a fit allowance and a fitting or mating force of the oil seal in accordance with the present invention and the prior art oil seal. In this Figure the letter C refers to this invention, D the prior art and S the suitable fitting or mating force. Curve E represents this invention when the thickness of the metallic reinforcement is 0.5 mm, and curve F represents the prior art wherein the thickness of the metallic reinforcement was 1 mm.

DETAILED DESCRIPTION OF THE EMBODIMENTS

Figure 1:
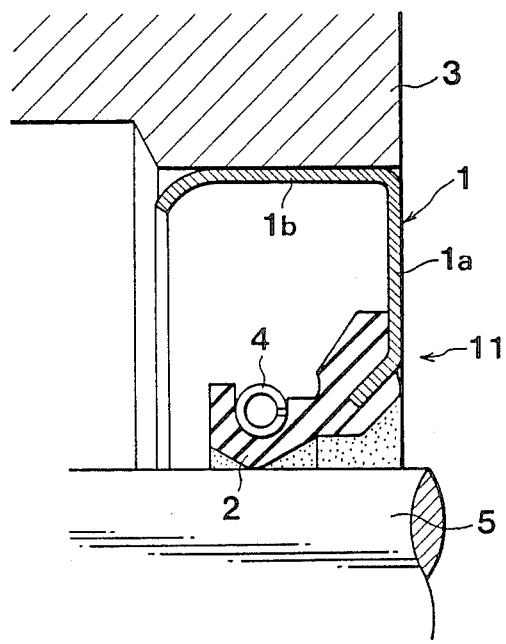
FIG. 1 is a fragmentary longitudinal sectional view of an oil seal in accordance with the present invention is fitted into a housing.

Referring first to FIG. 1, an oil seal generally indicated by the reference numeral 11 has a metallic reinforcement ring 1 which is made of an extremely thin sheet metal and has a substantially L-shaped cross sectional configuration and a seal lip 2 made of a heat resistant rubber such as fluoro rubber is attached to the inner peripheral edge portion bend obliquely upwardly of a substantially horizontal flange portion 1a of the ring 1.

The metallic reinforcement ring 1 made of a sheet metal in the form of an L as described above, is then subjected to a hardening process such as the nitriding process, the cementation process or any other suitable heat treatment so that its strength and hardness are increased and consequently the outer peripheral or cylindrical portion 1b of the ring 1 has a high degree of durability or a high elastic limit.

In general, the thickness of the metallic reinforcement ring 1 varies depending upon the outer diameter thereof and is as thin as ⅓ to ½ as compared with the conventional oil seals. For instance, the thickness of a conventional oil seals less than 30 mm in outer diameter is 0.5 mm while the thickness of an oil seal of the present invention having a corresponding outer diameter is only 0.3 mm. As compared with the thickness of 0.8 mm of the conventional oil seals 30–60 mm in outer diameter, the thickness of the oil seal of the present invention having a corresponding outer diameter is only 0.4 mm. Also as compared with the thickness of 1.0 mm of the prior art oil seals 60 mm–120 mm in outer diameter, the thickness of the oil seal of the present invention having a corresponding outer diameter is only 0.5 mm.

It is preferably that a sealing agent such as sealant is applied to the outer mating cylindrical surface of the outer peripheral portion 1b of the metallic reinforcement ring 1.

The oil seal 11 with the above-described construction is used, for instance, to seal the crankshaft of a high-output automotive engine made of an aluminum alloy. Even when a housing 3 into which is fitted the oil seal 11 is made of a material such as an aluminum alloy or a plastic having a relatively high coefficient of thermal expansion and is heated to high temperatures about 200° C., the outer periphery portion 1b of the hardened metallic reinforcement ring 1 still sufficiently maintains a high degree of durability so that even at high temperatures, a sufficient fit allowance can be maintained, whereby the coming off the oil seal 11 from the housing 3 and the leakage of oil can be prevented.

Figure 2:
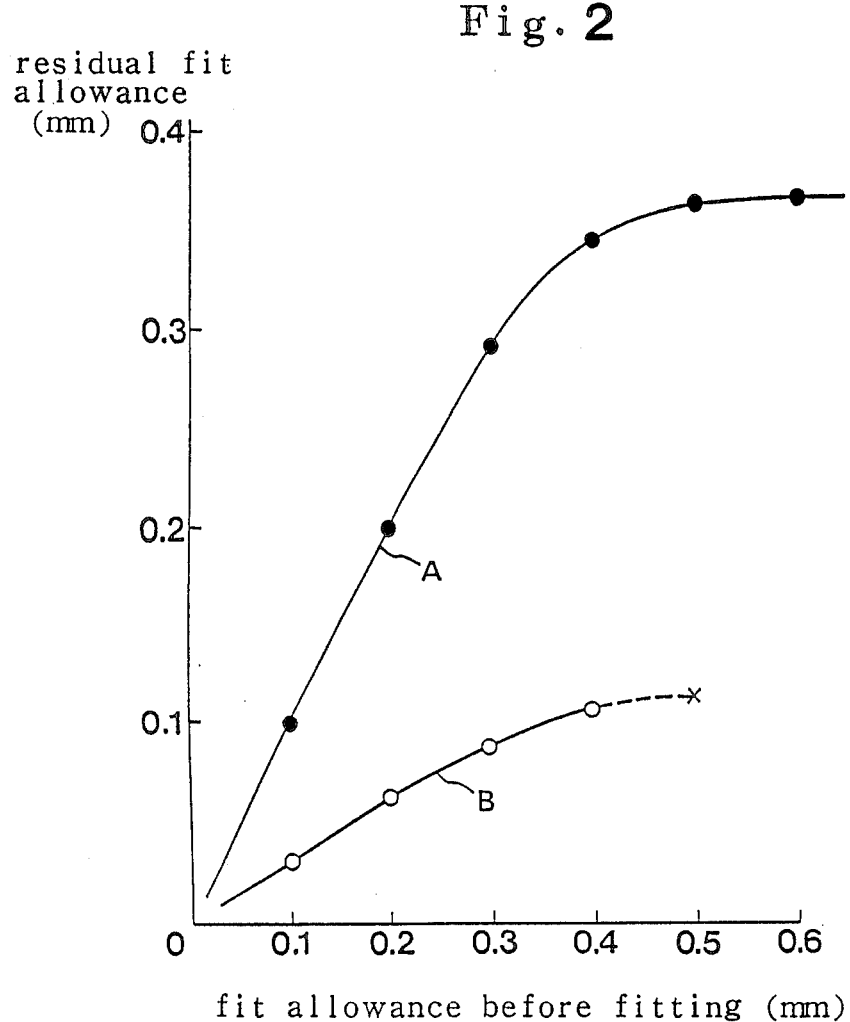
FIG. 2 is a graph illustrating the relationships between a fit allowance before the oil seal in accordance with the present invention and the prior art oil seal are fitted into the housings and a residual fit allowance after they are fitted into the housing where curve A represents the invention subjected to the nitriding process and curve B represents the prior art (SPCC). The point X at the end of curve B means that fitting was impossible. The metallic reinforcement ring was 100 mm in outer diameter and 0.5 mm in thickness.
Figure 3:
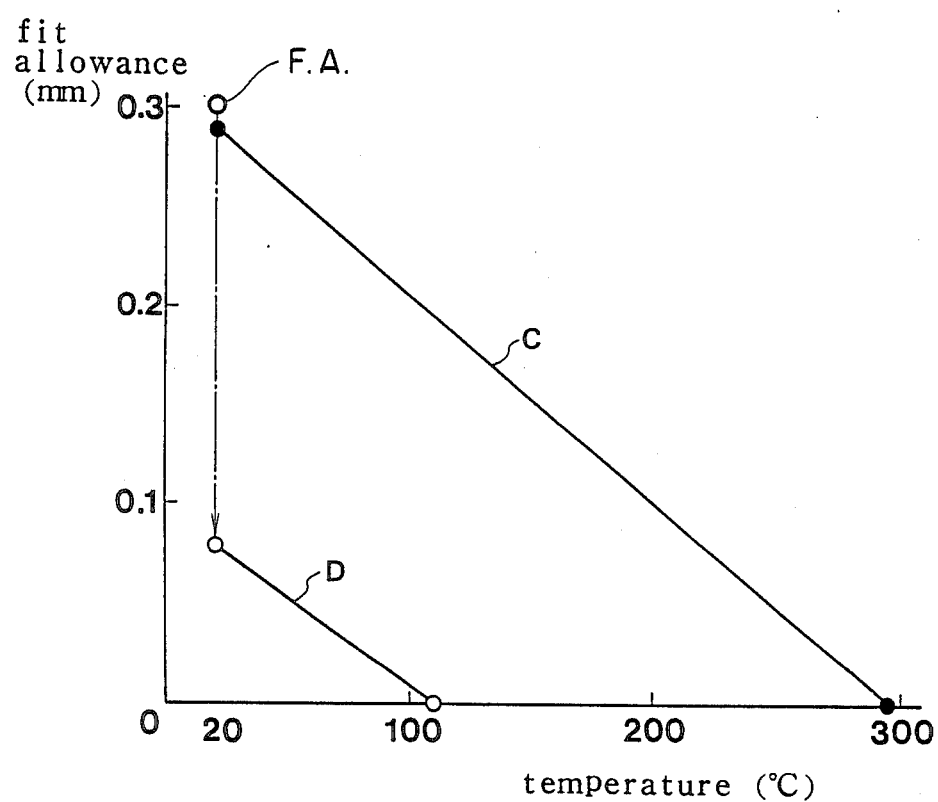
FIG. 3 is a graph illustrating the variations in residual fit allowance of the oil seal in accordance with the present invention (curve C) and the prior art oil seal (curve D) when the temperature of the housing rises and wherein the metallic reinforcement ring was 100 mm in outer diameter and 0.5 mm in thickness, and wherein the point "F.A." means the fit allowance before fitting of the prior art oil seal.

That is, as indicated by the curve A in FIG. 2, the fit allowance before fitting and the residual fit allowance after fitting of the metallic reinforcement ring 1 of the oil seal 11 in accordance with the present invention are substantially equal until the fit allowance before fitting is 0.3 mm, so that the initial fit allowance can be satisfactorily maintained. Furthermore, as indicated by the curve C in FIG. 3, the residual fit allowance of the oil seal 11 which has the metallic reinforcement ring 1 having 100 mm in outer diameter and 0.5 mm in thickness and subjected to the nitriding process and which is fitted at room temperature into the housing made of an aluminum alloy maintains a fit allowance (0.3 mm) defined when the metallic reinforcement ring 1 was formed and when the housing 3 is gradually heated so that its inner diameter is increased due to thermal expansion, the residual fit allowance is gradually decreased as indicated by the curve C in FIG. 3. And when the housing 3 is heated to about 200° C., the residual fit allowance becomes 0.1 mm so that the satisfactory fit mating between the housing 3 and the oil seal 11 can be maintained.

Thus it is apparent that the fit allowance at a high temperature range hitherto unattainable by the prior art metallic reinforcement ring can be maintained by the metallic reinforcement ring 1 in accordance with the present invention.

In addition, as indicated by the curve E in FIG. 4, the permissible range of fit allowance relative to the permissible range of suitable fit mating force is increased so that the dimensional tolerance of the metallic reinforcement ring can be relaxed and consequently the fabrication of the metallic reinforcement rings is facilitated accordingly.

There is a tendency that the higher the fit allowance before fitting, the higher the residual fit allowance becomes at high temperatures, but when the fit allowance is too great, it becomes difficult to fit an oil seal into a housing so that it is preferable that the upper limit of the fit allowance before fitting be of the order of 0.4 mm.

The metallic reinforcement ring 1 is always mated with the housing 3 with a suitable fit allowance so that the seal lip 2 is always made into satisfactorily intimate contact with the outer cylindrical surface of a rotating shaft 5 under the force of a spring 4 fitted over the radially outward surface of the seal lip 2, whereby the positive oil seal is always ensured.

What is claimed is:

1. An oil seal of the type having a metallic reinforcement ring whose outer peripheral portion is oil-tightly fitted into a housing, characterized in that after the formation or fabrication of said metallic reinforcement ring, the latter is subjected to a hardening process so that its durability is increased beyond an inherent durability of a raw material of said metallic reinforcement ring; and a seal lip is formed over the inner peripheral edge portion of an annular flange portion of said metallic reinforcement ring.

2. An oil seal as set forth in claim 1 wherein said hardening process consists of a nitriding process.

3. An oil seal as set forth in claim 1 wherein said housing is made of a material having a coefficient of thermal expansion higher than that of iron.

* * * * *